United States Patent [19]

Auger

[11] 4,292,797
[45] Oct. 6, 1981

[54] DUBBING WINDER

[76] Inventor: Arnold J. Auger, 1482 Zener, Pocatello, Id. 83201

[21] Appl. No.: 121,302

[22] Filed: Feb. 13, 1980

[51] Int. Cl.³ .............................................. D02G 3/42
[52] U.S. Cl. .......................................... 57/24; 28/144
[58] Field of Search .................. 57/203, 3, 22, 24, 28; 28/144; 242/7.01, 7.19

[56] References Cited

U.S. PATENT DOCUMENTS

| 754,084 | 3/1904 | McKain | 242/7.01 |
| 775,985 | 11/1904 | McKain | 242/7.01 |
| 3,343,357 | 9/1967 | Goodridge | 57/24 |
| 3,584,449 | 6/1971 | Pollard | 57/24 X |
| 3,657,870 | 4/1972 | Marks | 57/24 |
| 4,161,861 | 7/1979 | Storm | 57/22 |

Primary Examiner—Donald Watkins
Attorney, Agent, or Firm—Harvey B. Jacobson

[57] ABSTRACT

A first base having a longitudinal slot mounts a rotatable hook just above one end of the slot. A handle is attached for rotating the hook. A thread is extended from one secured position above the opposite end of the slot to the hook and back to the secured position. Dubbing material is placed between the two halves of the thread. A substantially planar abutment is pivotally mounted to the base and swung into position to close off the slot. When in position, the dubbing material is pressed against the abutment. The handle is turned thus twisting the thread and capturing the dubbing material between the twisted thread.

12 Claims, 9 Drawing Figures

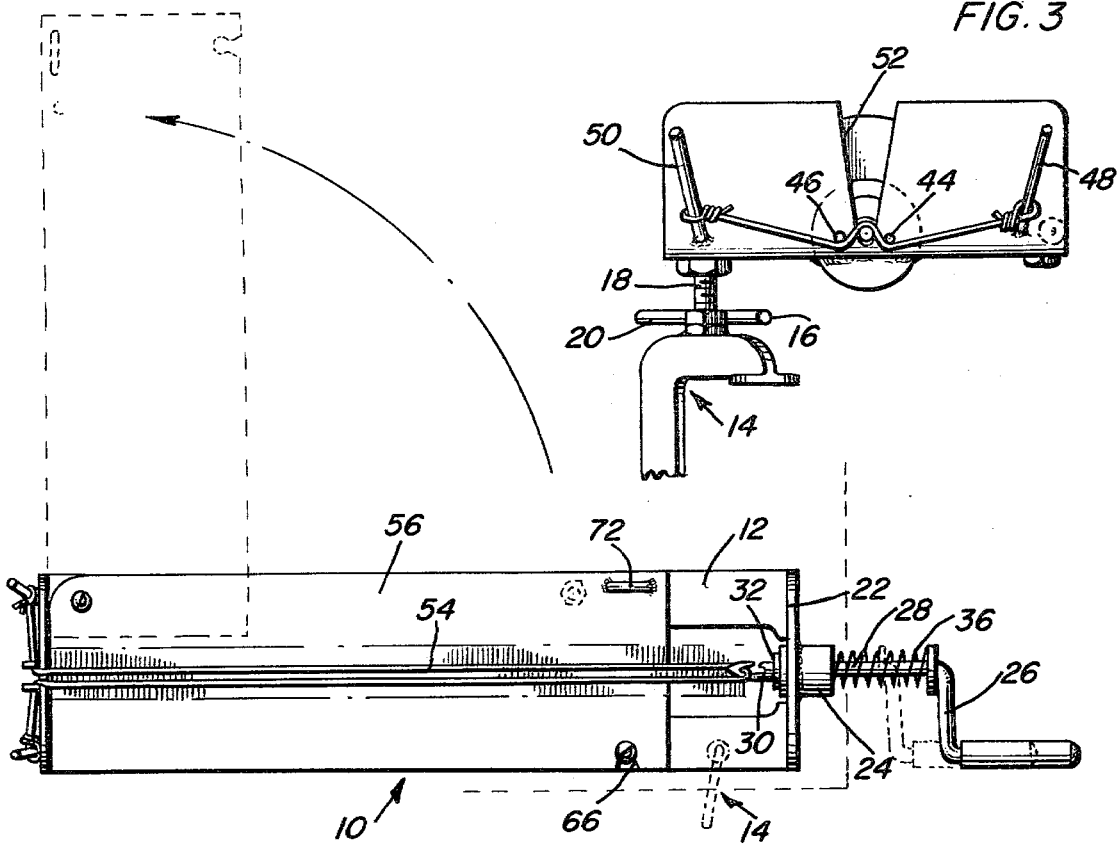
FIG. 1
FIG. 3
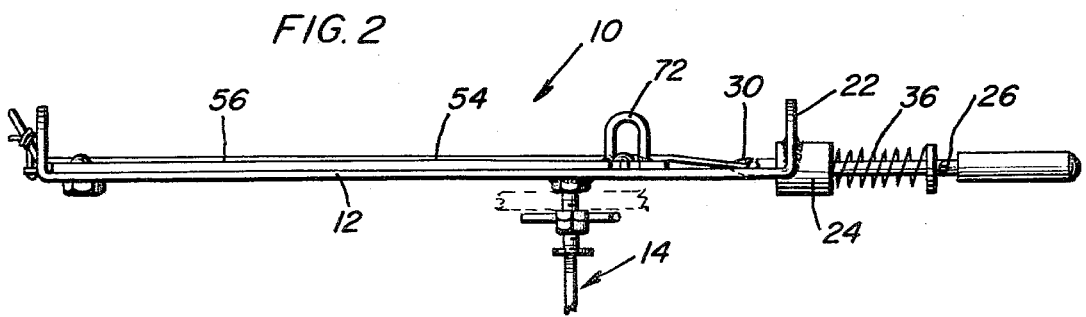
FIG. 2
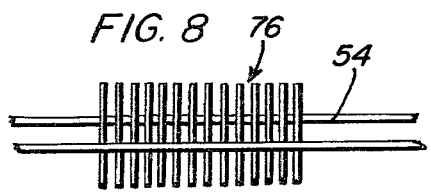
FIG. 8
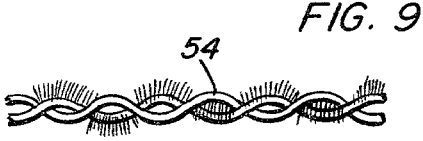
FIG. 9

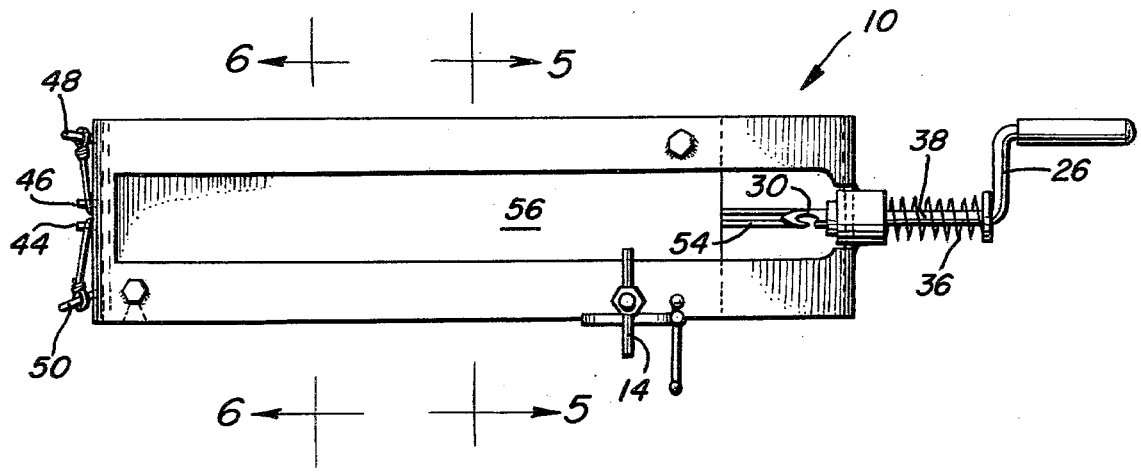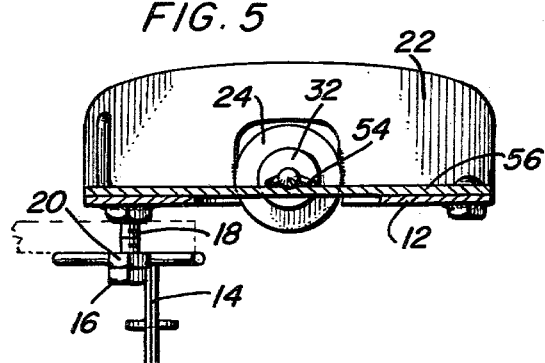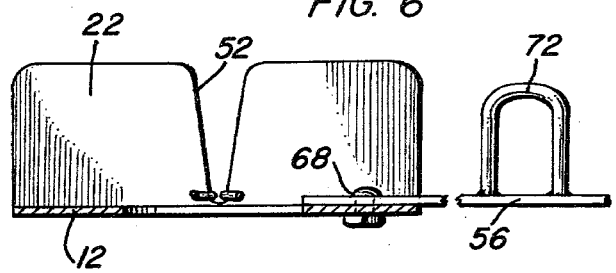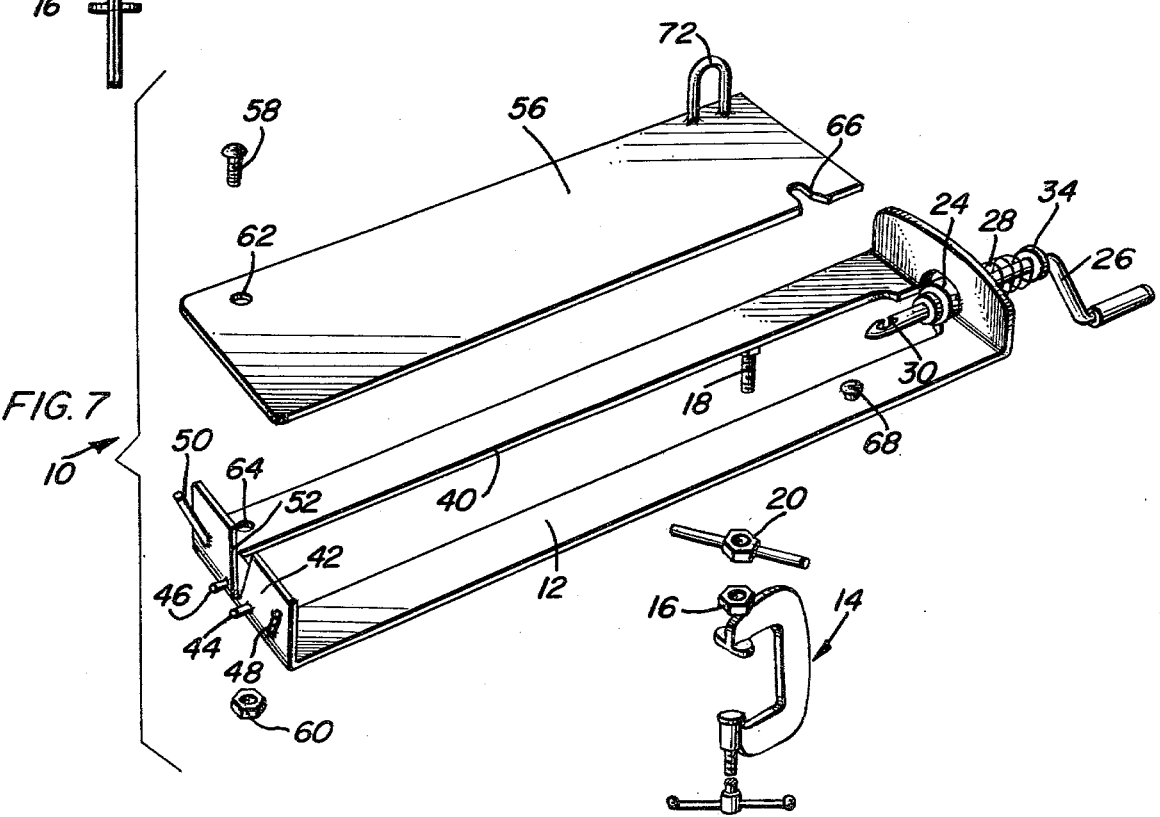

DUBBING WINDER

BACKGROUND OF THE INVENTION

1. Field of the Invention

This invention relates to tools adapted for the production of fishing lures and especially to tools for producing fur body material known as dubbing to be used in fly tieing.

2. Discussion of Related Art

The production of artificial flies for fishing often requires skill and craftsmanship. In order to facilitate hand winding of such flies, it is desirable to have the material for the fly body prepared beforehand so that it can be applied to a hook in the desired manner. No mechanisms are presently available which can quickly and easily produce such material, known as dubbing.

Certain devices are known for producing artificial, elongated wrapped articles. U.S. Pat. Nos. 754,084 and 775,985, both issued to McKain, show machines for manufacturing artificial flowers, vines, or the like. The McKain machines include opposed rotatable hooks which hold a taut wire about which the material is to be wrapped. The hooks are rotated through a pulley drive system and material is wrapped around the taut wire as it rotates on the hooks.

SUMMARY OF THE INVENTION

One object of the present invention is to provide a mechanism which can easily and effectively wind dubbing for the production of fishing lures.

An additional object of the present invention is to provide a dubbing winder which is easy to operate in that the material can be loaded and unloaded from the winder without difficulty.

An even still further object of the present invention is to provide a dubbing winder which includes a spring loaded crank to maintain the thread of the dubbing material in a taut condition.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the dubbing winder.

FIG. 2 is a side elevational view of the dubbing winder.

FIG. 3 is an end elevational view of the dubbing winder.

FIG. 4 is a bottom plan view of the dubbing winder.

FIG. 5 is an end elevational sectional view taken substantially along a plane passing through section line 5—5 of FIG. 4.

FIG. 6 is an end elevational sectional view taken substantially along a plane passing through section line 6—6 of FIG. 4. FIG. 7 is an exploded view of the elements of the dubbing winder.

FIG. 8 is a diagram showing the dubbing material disposed between two threads mounted on the dubbing winder.

FIG. 9 is a diagram showing the completed product comprising dubbing material twisted between threads.

DESCRIPTION OF THE PREFERRED EMBODIMENT

Now with reference to the drawings, a dubbing winder incorporating the principles and concepts of the present invention and generally referred to by the reference numeral 10 will be described in detail. Dubbing winder 10 includes a first base plate 12 which can be mounted on a table, desk top, or the like, by the use of a C-clamp 14 which is a standardly available C-clamp with a nut 16 welded to one side of the top portion of the C. A stud 18 is mounted extending downwardly from the bottom of base 12 and can threadedly engage nut 16 on the C-clamp. A wing nut 20 is also disposed on the stud 18 to act as a locking nut against nut 16 when the desired position of C-clamp 14 is achieved.

The base 12 is a substantially planar, rectangular plate having a mounting flange 22 extending upwardly on one end thereof. Flange 22 mounts a busing 24 which has an opening formed therein which is positioned just above the top surface of the base 12. A crank handle 26 has a main shaft 28 disposed through the opening in bushing 24. The opposite end of the shaft 28 has a thread anchoring hook 30 which protrudes from the end of the bushing. A washer 32 is affixed just behind hook 30 and abuts the face of bushing 24. A second washer 34 is disposed on the opposite end of shaft 28 and is abutted by a compression spring 36 to force the hook 30 toward the bushing 24. The hook 30 is actually disposed in an elongated opening 40 which extends longitudinally through the center of base 12. At the opposite end of the base 12 is a thread anchoring flange 42 which contains two holddown pins 44 and 46 and two tie pins 48 and 50. Located centrally in the flange 42 is a V-shaped notch 52, the apex of which is in alignment with the hook 30 such that a thread can be stretched between the apex of notch 52 and the hook 30 as shown with respect to thread 54. Waxed thread 54 is tied to the tie pins 48, 50 and strung below holddown pins 44, 46. The center of the thread is drawn between the sides of V-notch 54 and placed into hook 30. The length of the thread should be adjusted so that the hook 30 is drawn away from the bushing 24 in order that spring 28 can maintain the thread in constant tension.

A platform or abutment 56 comprising a substantially planar plate is pivotally attached to base plate 12 by screw 58 which passes through openings 62 and 64 in the corners of plates 56 and 12, respectively, and attaches to nut 60. A notch 66 is formed in the edge of plate 56 opposite the edge laying adjacent hole 62. Notch 66 cooperates with screw 68 which is held in base plate 12. Screw 68 acts as a stop when its hits the end of notch 66 to hold the base plate 56 over the top of base plate 12 so that opening 40 is substantially covered. In this position, as shown in FIG. 5, the hook 30 is positioned only sightly above plate 56 and thread 54 is actually in contact with the plate for reasons which will be apparent hereinafter. An inverted U-shaped bar 72 is attached to plate 56 and acts as a handle to facilitate moving of that plate.

In operation, thread 54 is disposed in the hook 30 and drawn beneath pins 44 and 46 and tied to pins 48 and 50 as shown. The plate 56 is swung into place beneath the waxed thread 54 and dubbing material is inserted between the sides of the thread 54 as depicted with reference to FIG. 8. The handle 26 is then turned to twist the thread about itself thus capturing the dubbing material between the threads and holding it there permanently.

At the same time, since waxed thread 54 abuts plate 56, the dubbing material 76 is pressed against the thread to form the final product. The handle is turned until the desired consistency of the dubbing material is attained. The plate 56 is then opened and the dubbing material grasped with the thumb and forefinger to assure complete contact of the dubbing material to the waxed thread 54. The handle 26 is then pressed inwardly against the bias of spring 36 so that the material can be detached from the hook 30 and removed, thus completing the process.

The dubbing winder 10 can be made from 1/16 inch sheet metal with a length of 7¾ inches for the plates 12 and 56. The slot 40 should be approximately 1 inch in width.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device for twisting dubbing on a thread, comprising: a base member having a substantially planar upper surface and opposite ends, a rotatable hook mounted on one of said ends of said base member, means for rotating said hook, said hook extending over said base member and being substantially parallel thereto; anchor means mounted on the other of said ends for tieing two ends of the thread at fixed laterally spaced positions, and means on the base member for inserting the dubbing on the thread.

2. The invention as defined in claim 1 wherein said dubbing inserting means includes a slot formed in the base member extending longitudinally thereof from a position below said hook to a position in the vicinity of said anchor means.

3. The invention as defined in claim 2 including a plate mounted to said base member for movement from a position covering said slot to a position uncovering said slot.

4. The invention as defined in claim 3 wherein said hook is positioned slightly above the upper surface of said base member.

5. The invention as defined in claim 4 wherein said anchor means includes a flange having a V-notch formed therein with an apex aligned with said hook.

6. The invention as defined in claim 5, said anchor means still further including a tie pin mounted on said flange on each side of said V-notch.

7. The invention as defined in claim 6, said anchor means still further including a holddown pin mounted on each side of said V-notch between said V-notch and said tie pin.

8. A device for twisting dubbing between sections of a thread, comprising a base, a pair of thread engaging anchors between which the thread is anchored, means mounting one of said anchors on the base for rotation about a twisting axis, means fixedly mounting the other of the anchors on the base in spaced relation to said one of the anchors, means connected to said one of the anchors for rotation thereof to twist said sections of the thread between said pair of anchors and abutment means movably mounted on the base for selective displacement to an operative position closely spaced from said twisting axis to hold the dubbing captured between the sections of the thread during twisting thereof.

9. The device as defined in claim 8 wherein said one of the anchors is a rotatable hook.

10. The device as defined in claim 9 wherein the mounting means for said hook accommodates limited axial displacement of the hook against a spring bias.

11. The device as defined in claim 10 wherein said base is formed with a dubbing insertion slot exposing the thread and covered by the abutment means in said operative position thereof.

12. The device as defined in claim 8 wherein said base is formed with a dubbing insertion slot exposing the thread and covered by the abutment means in said operative position thereof.

* * * * *